United States Patent Office 2,925,318
Patented Feb. 16, 1960

2,925,318

METHOD OF RETARDING WATER SURFACE EVAPORATION

Francis W. Crawford and Charles E. Stoops, Bartlesville, Okla., assignors to Phillips Petroleum Company, a corporation of Delaware No Drawing. Application April 10, 1958
Serial No. 727,541

4 Claims. (Cl. 21—60.5)

This invention relates to a method for retarding water surface evaporation. In one of its aspects, the invention relates to the application to the surface of water long straight-chain primary alcohols containing an uneven number of carbon atoms. In another of its aspects, the invention relates to the retarding of the rate of water loss from a water reservoir by floating upon the surface of the water in said reservoir an amount of such an alcohol sufficient to cover the surface with a film of the alcohol.

The problem of reducing water surface evaporation to reduce the loss of water is old and well known. The covering of the surface of water reservoirs is, indeed, a challenging problem when one considers the area to be covered and related problems. One of the problems related to sufficiently covering the surface of water in a reservoir which, of course, is open to invasion of all kinds of forms of life is that of microbial degradation. This degradation or destruction results in a measurable consumption of the agent. Over a period of time, the increased cost and loss of effectiveness amounts to a large overall expense.

It is an object of this invention to provide a method for controlling loss of water by surface evaporation. It is another object of this invention to provide a method of reducing water loss by surface evaporation in reservoirs.

Other aspects, objects and the several advantages of this invention are apparent from a study of this disclosure and the appended claims.

According to the present invention, long straight-chain primary alcohols containing an odd number of carbon atoms, which can be prepared as later described, preferably containing an average of from 17 to 35 carbon atoms in the chain, are floated on the surface of water to retard evaporation of the water.

The alcohols used according to this invention are considerably less susceptible to microbial degradation than cetyl alcohol only recently reported as tested for the reduction of evaporation of water, Water and Sewage Works (August 1956), pages 346–347.

The application of the alcohol selected according to the invention is accomplished simply by placing the alcohol on the surface of the water. When the alcohol is applied to the surface, it immediately begins to form a film.

In Serial No. 548,233, filed November 21, 1955, by Charles E. Stoops and James M. Day, there is set forth and claimed a process for making a high molecular alcohol which comprises subjecting a mixture containing a low molecular weight alcohol and an olefin to ionizing radiation at certain levels of radiation for times sufficient to produce certain total dosages. The process set forth in said copending application Serial No. 548,233 is suited to the preparation of the alcohols which are used according to the present invention. Indeed, the alcohols used in the examples reported herein were prepared according to the process of the said copending application.

TABLE I

Identification of irradiated samples

| Sample No. | Methanol Charged, Grams | Ethylene Pressure, p.s.i.g. | Temp., °F. | Internal Dose Rate, Roentgens/hr. | Internal Dose, Roentgens | Molecular Weight (Average) |
|---|---|---|---|---|---|---|
| 1 | 473 | 250 | 200 | $1.3 \times 10^6$ | $1.0 \times 10^7$ | 415 |
| 2 | 442.6 | 450–500 | 225 | $1.9 \times 10^5$ | $1.17 \times 10^7$ | [1] 431 |

[1] Pot residue BP > 193° C. @ 0.64 cm. Hg.

NOTE.—Sample 1 is solid phase recovered from the liquid portion after weathering. Sample 2 is a fraction from distillation. The reaction mixture, after inactivation, was filtered. The filtrate was weathered to remove excess methanol. The residue, a liquid, was vacuum distilled. Sample 2 is the pot residue. The molecular weights of 1 and 2 indicate them to have a chain length of approximately 28 and 29 carbon atoms, average.

TABLE II

| Sample No. | Ml. of Water Added Daily | | | | | | | | | | Percent Retardation |
|---|---|---|---|---|---|---|---|---|---|---|---|
| | 3/10/57 | 3/11/57 | 3/12 | 3/13 | 3/14 | 3/15 | 3/16 | 3/17 | 3/18 | Total | |
| 1 | | | | | | | | | | | |
| in deionized water | 16 | 18 | 12 | 14 | 16 | 23 | 17 | 17 | 18 | 151 | 84.8 |
| in tap water | 40 | 36 | 22 | 20 | 22 | 22 | 21 | 21 | 21 | 224 | 77.8 |
| in tap water+microorganisms | 68 | 70 | 88 | 69 | 64 | 56 | 56 | 60 | 58 | 589 | 43.5 |
| 3 | | | | | | | | | | | |
| in deionized water | 73 | 74 | 72 | 54 | 64 | 55 | 47 | 46 | 43 | 528 | 47.0 |
| in tap water | 72 | 70 | 62 | 62 | 52 | 55 | 48 | 52 | 46 | 519 | [1] 48.2 |
| in tap water+microorganisms | 102 | 112 | 120 | 98 | 100 | 100 | 86 | 82 | 92 | 892 | 15.0 |
| 4 | | | | | | | | | | | |
| in deionized water | 139 | 126 | 131 | 108 | 106 | 106 | 98 | 92 | 90 | 996 | [2] |
| in tap water | 136 | 129 | 128 | 110 | 101 | 114 | 98 | 93 | 91 | 1002 | [2] |
| in tap water+microorganisms | 147 | 143 | 140 | 112 | 112 | 110 | 98 | 90 | 94 | 1046 | [2] |
| 2 | | | | | | | | | | | |
| in deionized water | 30 | 27 | 23 | 24 | 25 | 23 | 22 | 19 | 19 | 212 | 78.7 |
| in tap water | 31 | 26 | 24 | 20 | 18 | 26 | 21 | 22 | 21 | 209 | 79.2 |
| in tap water+microorganisms | 52 | 49 | 54 | 48 | 45 | 42 | 42 | 43 | 43 | 418 | 60.0 |

[1] Cetyl alcohol.
[2] Blank.

The tests recorded in Table II were made by using one liter beakers, partially filled with water and with 100 mgs. of sample on the surface of the water. From the results obtained it can be seen that the irradiation products were better for retarding the rate of evaporation of water in deionized water and tap water with and without soil microorganisms present.

It is noted that alcohols prepared from ethylene and methanol have an odd number of carbon atoms in the chain. This, of course, does not mean that such alcohols cannot have an average number of chain carbons approximating an even number. Thus, although herein an average of 28 carbon atoms is given for sample 1, it should be recognized that the value of 28 is, as stated, an average.

A consideration of Table II will show the greatly increased superiority of the alcohols of the present invention over earlier tested cetyl alcohol. The percent retardation with sample 1 dropped from 84.8 percent only to 43.5 percent when replacing deionized water with tap water plus microorganisms. This is to be contrasted sharply with the drop for cetyl alcohol from 47 percent, already a figure only slightly better than half that of sample 1, all the way down to 15 percent which is less than one-third of the original value of 47 percent. Indeed, the lowest figure for percent retardation obtained with an alcohol according to the invention differs but slightly from the best figure obtained for cetyl alcohol.

Generally, the amount of the alcohol to be applied to the surface of the water can be determined by mere routine test by one skilled in the art in possession of this disclosure bearing in mind the extent and duration of protection desired. Of the order of approximately less than 1 pound per acre per day will give a desirable protection. Thus, 0.05 to 0.25 pound of the alcohol distributed across the surface daily will give good protection. Depending upon weather conditions, wind velocity and other circumstances, even lower or higher amounts can be useful.

The products of the invention are gel-like or soft solids and will be distributed on the surface by suspending them in a perforated container, preferably on the windward side of the body of water, thus making use of the wind to spread the film across the surface of the water. The internal dosage rates which are applicable to the preparation of the products of the invention are generally within the range $1 \times 10^3$ to $1 \times 10^{10}$ roentgens. The total internal end dosages are in the range $10^5$ to $10^{11}$ roentgens.

Reasonable variation and modification are possible within the scope of the foregoing disclosure and the appended claims to the invention, the essence of which is that long straight-chain primary alcohols containing an odd number of carbon atoms which can be prepared by irradiating a low molecular weight alcohol with an olefin, for example, by irradiating methanol and ethylene, is used to prevent water surface evaporation.

We claim:

1. A method for retarding the evaporation of water from a surface thereof which comprises adding to said surface a synthetic long straight-chain primary alcohol containing an odd number of carbon atoms.

2. A method for retarding the evaporation of water from a surface thereof which comprises adding to said surface a synthetic long straight-chain primary alcohol containing an odd number of carbon atoms, said alcohol having an average chain length in the range of $C_{17}$–$C_{35}$.

3. A method for preventing evaporation of water from a surface thereof which comprises adding to the surface of said water a high molecular weight alcohol having an uneven number of carbon atoms in the range $C_{17}$–$C_{35}$, having a long straight-chain primary alcohol structure, and having been prepared by irradiation of methanol and ethylene at a temperature in the approximate range 200–225° F.

4. A method of retarding evaporation of water from a reservoir thereof which comprises adding to the surface of said water a high molecular weight alcohol having an uneven number of carbon atoms in the range $C_{17}$–$C_{35}$, having a straight-chain primary alcohol structure, and having been prepared by irradiation of methanol and ethylene at a temperature in the approximate range 200–225° F. at a pressure of ethylene in the approximate range of 250–500 p.s.i.g. and at an internal dose rate, generally within the range $1 \times 10^3$ to $1 \times 10^{10}$ roentgens.

References Cited in the file of this patent

Sebba et al.: Jour. of the Chem. Soc., January–June 1940, pp. 106–114.

Mansfield: Nature, vol. 175, January–March 1955, pp. 247–249.